(12) United States Patent  
Yamada

(10) Patent No.: US 8,878,508 B2
(45) Date of Patent: Nov. 4, 2014

(54) DC-DC CONVERTER CONTROL CIRCUIT AND CONTROL METHOD

(75) Inventor: Kouhei Yamada, Matsumoto (JP)

(73) Assignee: Fuji Electric Co., Ltd., Kawasaki-Shi (JP)

( * ) Notice: Subject to any disclaimer, the term of this patent is extended or adjusted under 35 U.S.C. 154(b) by 461 days.

(21) Appl. No.: 13/411,511

(22) Filed: Mar. 2, 2012

(65) Prior Publication Data

US 2012/0223690 A1 Sep. 6, 2012

(30) Foreign Application Priority Data

Mar. 4, 2011 (JP) ................. 2011-048156

(51) Int. Cl.
*H02M 3/156* (2006.01)

(52) U.S. Cl.
CPC ................... *H02M 3/156* (2013.01)
USPC ........................................ 323/284

(58) Field of Classification Search
USPC ............... 323/282, 283, 284, 285, 351
See application file for complete search history.

(56) References Cited

U.S. PATENT DOCUMENTS

| 8,587,274 | B2* | 11/2013 | Strydom et al. | 323/282 |
| 2002/0017897 | A1* | 2/2002 | Wilcox et al. | 323/282 |
| 2005/0104570 | A1* | 5/2005 | Lee et al. | 323/282 |
| 2009/0302817 | A1 | 12/2009 | Nagai | |
| 2011/0241641 | A1* | 10/2011 | Chen et al. | 323/284 |

FOREIGN PATENT DOCUMENTS

JP 2010-022186 A 1/2010

* cited by examiner

*Primary Examiner* — Gary L Laxton
(74) *Attorney, Agent, or Firm* — Rabin & Berdo, P.C.

(57) ABSTRACT

A control circuit of a DC-DC converter that has a switching element, including an error amplifier that amplifies a difference between a reference voltage and a feedback voltage corresponding to an output voltage of the DC-DC converter, a voltage reduction comparator that outputs an interrupt signal when the feedback voltage is lower than a voltage reduction threshold that has a value lower than that of the reference voltage, and a pulse-width modulation (PWM) signal generator circuit. The PWM signal generator circuit generates a PWM signal of a predetermined frequency based on the voltage difference when no interrupt signal is generated, or otherwise generates a switch drive signal to activate the switching element for a first period of time corresponding to the difference output by the error amplifier, and to deactivate the switching element for a second period of time after the first period of time has elapsed.

8 Claims, 4 Drawing Sheets

DIAGRAM SHOWING A CONFIGURATION OF A DC-DC CONVERTER CONTROL CIRCUIT ACCORDING TO AN EMBODIMENT OF THE INVENTION

FIG.1 DIAGRAM SHOWING A CONFIGURATION OF A DC-DC CONVERTER CONTROL CIRCUIT ACCORDING TO AN EMBODIMENT OF THE INVENTION

FIG.2 DIAGRAM SHOWING A CONFIGURATION OF A PWM SIGNAL GENERATOR CIRCUIT USED IN THE DC-DC CONVERTER CONTROL CIRCUIT SHOWN IN FIG. 1

DIAGRAMS SHOWING AN OPERATION WAVEFORM FOR EACH
PORTION OF THE PWM SIGNAL GENERATOR CIRCUIT SHOWN IN FIG.2
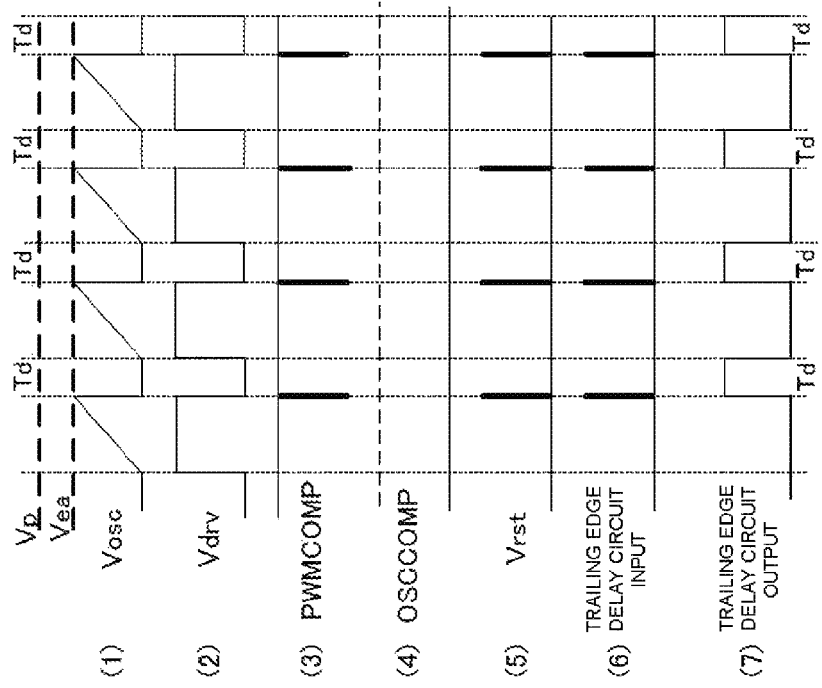
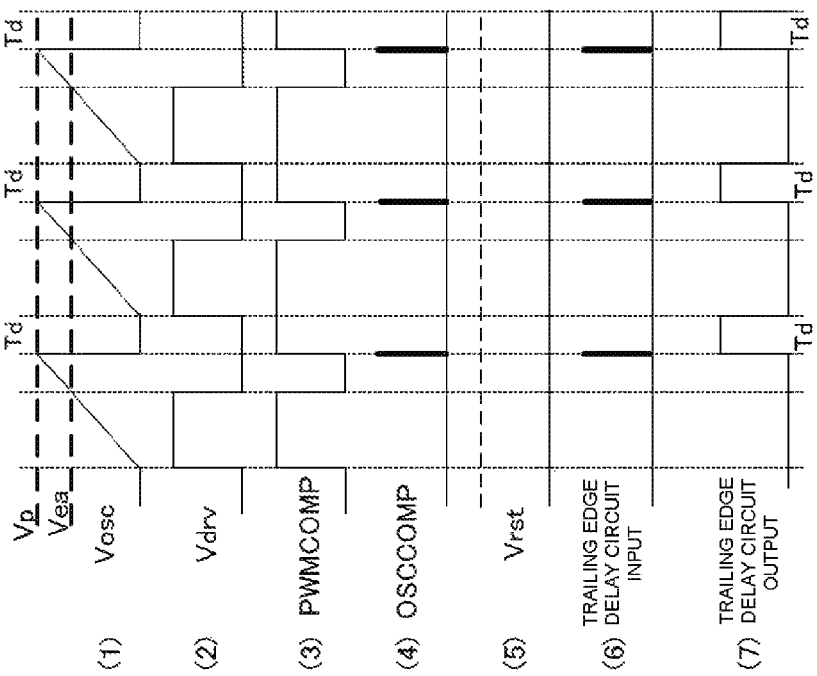
FIG.3

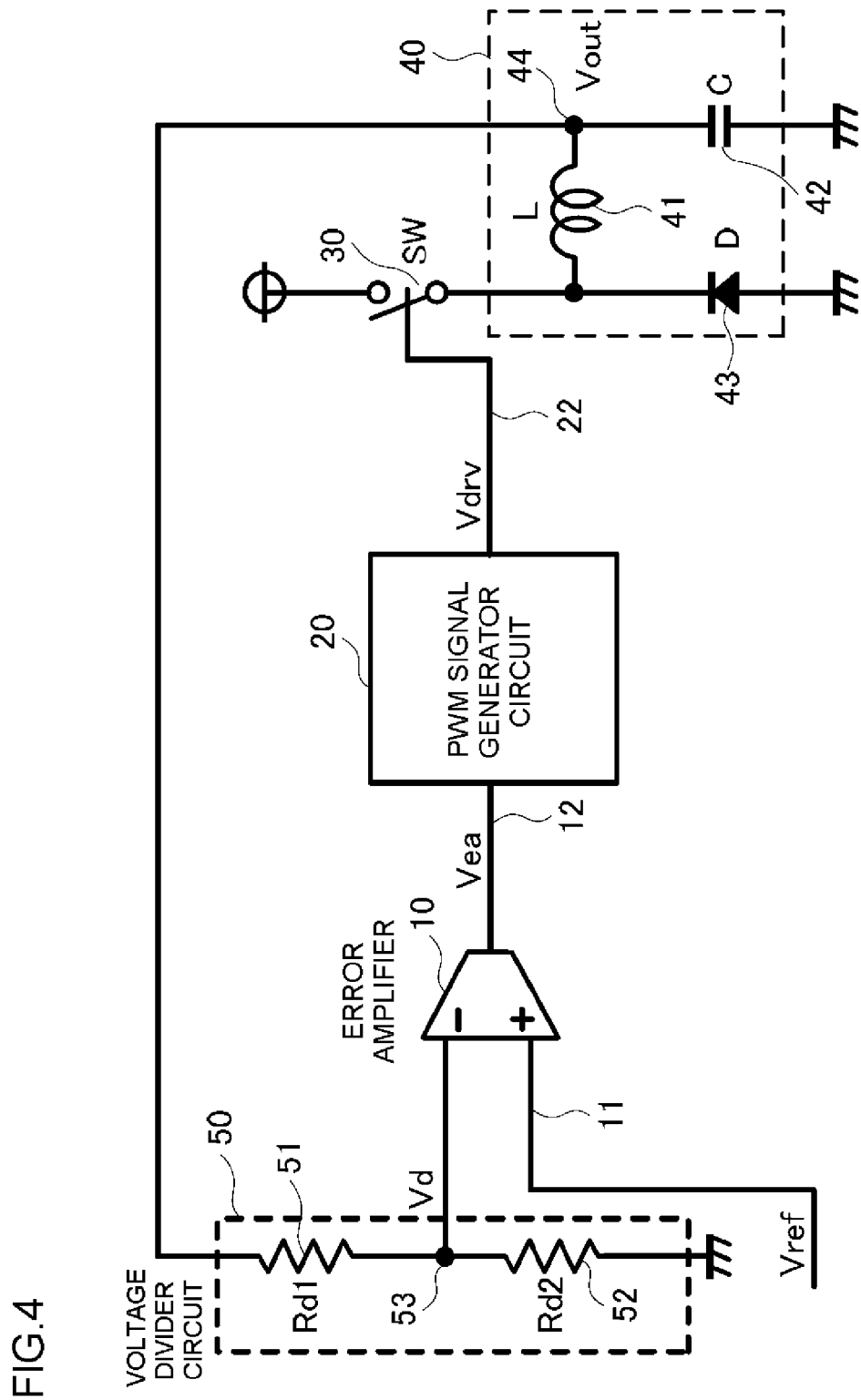
FIG.4 DIAGRAM SHOWING A CONFIGURATION OF A HERETOFORE KNOWN DC-DC CONVERTER CONTROL CIRCUIT

US 8,878,508 B2

DC-DC CONVERTER CONTROL CIRCUIT AND CONTROL METHOD

BACKGROUND OF THE INVENTION

1. Technical Field

The present invention relates to a technology that, by interrupting a normal pulse-width modulation (PWM) control and carrying out a control whereby an ON time of a switching element is repeated before and after a predetermined OFF time, suppresses an output voltage reduction when the output voltage of a DC-DC converter drops below a predetermined value due to a load current suddenly increasing, or the like.

2. Related Art

FIG. 4 is a diagram showing a configuration of a general DC-DC converter control circuit for controlling an output voltage of a heretofore known DC-DC converter. In FIG. 4, an error amplifier 10 amplifies the difference between a reference voltage Vref 11 and a feedback voltage Vd 53 acquired by a voltage division of a DC-DC converter output voltage Vout 44 in a voltage divider circuit 50 that has a voltage divider resistor Rd1 51 and a voltage divider resistor Rd2 52, and outputs an output voltage Vea 12 as an output to a PWM signal generator circuit 20. The PWM signal generator circuit 20 generates a switch drive signal Vdrv 22 in accordance with the output voltage Vea 12 of the error amplifier 10 (in this case, the PWM signal generator circuit 20 may be such that a minimum value of an ON time or OFF time is set in accordance with specifications). A switch SW 30 is driven by the switch drive signal Vdrv 22, as a result of which an output voltage Vout 44 in an output circuit 40 is maintained at a predetermined target value by a negative feedback control. The output circuit 40 is configured to include an inductor L 41, an output capacitor C 42, and a commutating diode D 43 that contribute to an accumulation and release of energy, wherein the output voltage Vout 44 resulting at one terminal of the output capacitor C 42 is supplied to a load (not shown).

Normally, as the DC-DC converter control circuit is such that the response of the negative feedback control loop controlled by the error amplifier 10 is set to be somewhat slow in order to stably operate the DC-DC converter, time is needed until the output voltage Vout 44 is static at the target value when a load current (a current flowing from the inductor L 41 and output capacitor C 42 in which energy is accumulated to the load (not shown)) increases suddenly, and there is a problem in that the output voltage Vout 44 drops considerably.

In response to this, a method whereby it is detected that an output voltage Vout has dropped below a predetermined value, a switching frequency is temporarily switched to a high frequency with this as a trigger, and an inductor current is increased, is disclosed in JP-A-2010-022186.

With the method disclosed in JP-A-2010-022186 too, it is thought that a certain effect for not allowing a large drop in the output voltage Vout is obtained. However, as an ON time period at a point at which an output voltage fluctuation occurs varies depending on operating conditions, and also changes during a transient response, it is difficult to choose an optimum switching frequency for all conditions with the method disclosed in JP-A-2010-022186 (while the effect is insufficient when a switching cycle is too long in comparison with the ON time period, the ON condition continues when the switching cycle is shorter than the ON time period).

SUMMARY OF THE INVENTION

Therefore, the invention has an object of providing a DC-DC converter control circuit and control method that reduce the amount of a drop in output voltage when a load current increases suddenly by driving a switch by switching from a fixed frequency PWM control of a switching element to a control whereby an ON time is set before and after a predetermined OFF time.

In order to achieve the object, a DC-DC converter control circuit of one aspect of the invention includes an error amplifier that amplifies and outputs the difference between a feedback voltage of a DC-DC converter output voltage and a first reference voltage, a voltage reduction comparator that outputs an interrupt signal when the feedback voltage is lower than a voltage reduction threshold value set lower than the first reference voltage, and a PWM signal generator circuit that, in order to drive a switching element of the DC-DC converter, generates a PWM signal of a predetermined frequency based on the output voltage of the error amplifier when no interrupt signal is generated and, when an interrupt signal is generated, generates switch drive signals activating the switching element for an ON time determined based on the output voltage of the error amplifier, and deactivating the switching element for a predetermined time after the ON time has elapsed.

Also, the DC-DC converter control circuit according to the aspect of the invention is such that the voltage reduction threshold value is realized by inputting the first reference voltage into one input terminal of the voltage reduction comparator and causing the voltage reduction comparator to generate an input offset voltage of a predetermined voltage.

Furthermore, the DC-DC converter control circuit according to the aspect of the invention is such that the voltage reduction threshold value is configured so that a voltage lower by a predetermined voltage than the first reference voltage is generated, and supplied to the input of the voltage reduction comparator.

Also, a DC-DC converter control method of another aspect of the invention includes a step of amplifying and outputting the difference between a feedback voltage of a DC-DC converter output voltage and a first reference voltage, a step of outputting an interrupt signal when the feedback voltage is lower than a voltage reduction threshold value set lower than the first reference voltage, and a step of shifting a signal for driving a switching element of the DC-DC converter from a PWM signal of a predetermined frequency generated based on the amplified, output differential voltage to switch drive signals activating the switching element for an ON time determined based on the output voltage of the error amplifier, and deactivating the switching element for a predetermined time after the ON time has elapsed, when an interrupt signal is generated.

According to the invention, when it is detected that the output voltage of a DC-DC converter has dropped below a predetermined value, a switch is driven by switching from a fixed frequency PWM control based on the output voltage of an error amplifier to a control whereby an ON time determined based on the output voltage of the error amplifier is set before and after a predetermined OFF time, meaning that it is possible to suppress a drop in the output voltage of the DC-DC converter.

BRIEF DESCRIPTION OF THE DRAWINGS

FIGS. 3A and 3B are diagrams showing an operation waveform for each portion of the PWM signal generator circuit shown in FIG. 2; and FIG. 4 is a diagram showing a configuration of a heretofore known DC-DC converter control circuit.

DETAILED DESCRIPTION OF THE EMBODIMENTS

Hereafter, a detailed description will be given of an embodiment of the invention.

Embodiment

Figure 1:
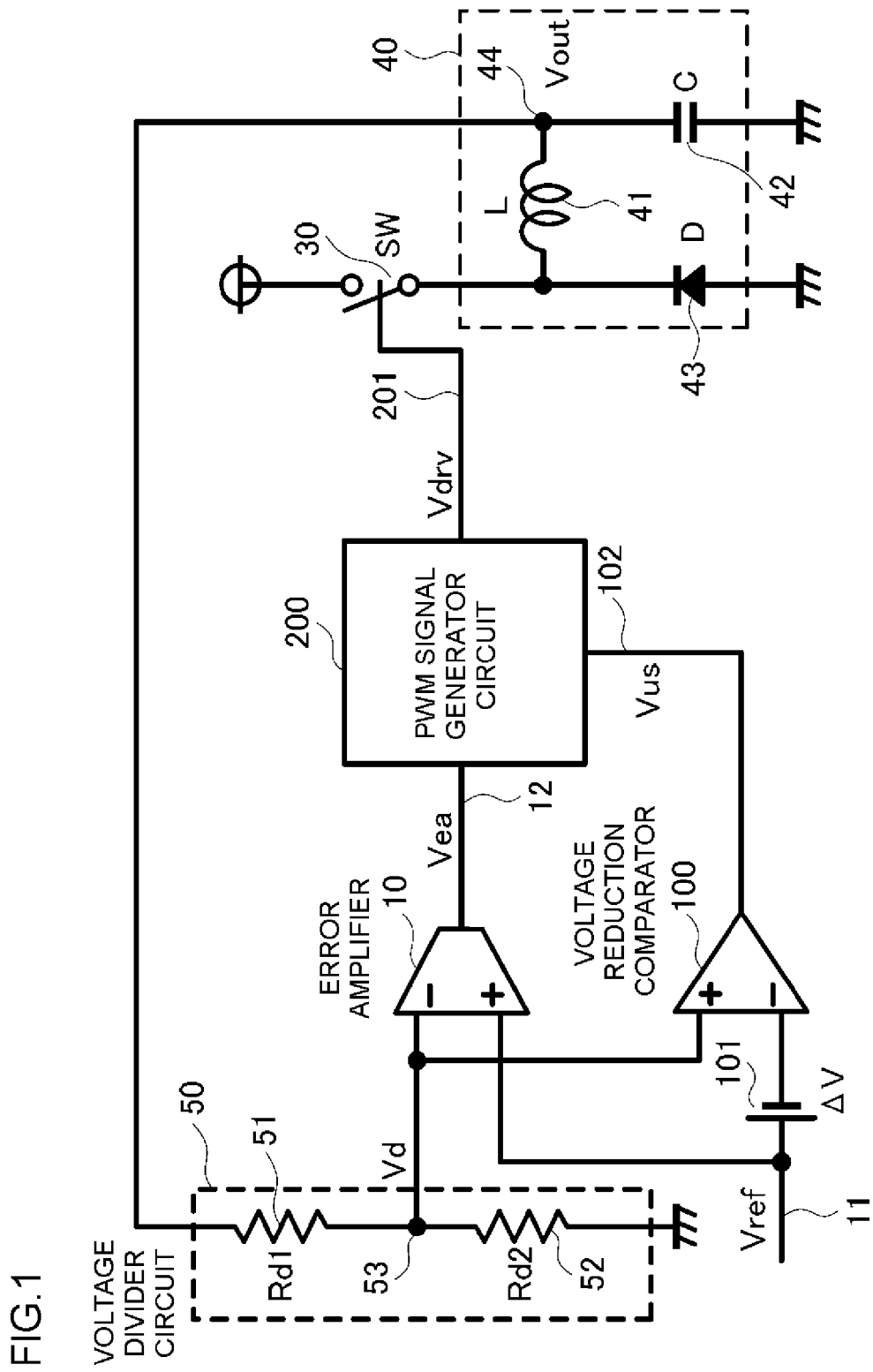
FIG. 1 is a diagram showing a configuration of a DC-DC converter control circuit according to an embodiment of the invention.

FIG. 1 is a diagram showing a configuration of a DC-DC converter control circuit according to an embodiment of the invention. The DC-DC converter control circuit according to the embodiment of the invention shown in FIG. 1 is configured in such a way that there is provided a voltage reduction comparator 100 that outputs an interrupt signal when a feedback voltage Vd of an output voltage Vout 44 of the DC-DC converter is lower than a voltage reduction threshold value (hereafter referred to as "Vref−ΔV") set lower than a reference voltage Vref, and an interrupt signal is supplied to a PWM signal generator circuit 200 in accordance with a level value of an output Vus 102 of the voltage reduction comparator 100 obtained from the result of a comparison by the voltage reduction comparator 100 of the feedback voltage Vd 53 and the voltage "Vref−ΔV" set to be lower than the reference voltage Vref 11 by the predetermined voltage ΔV 101. As a configuration other than this is the same as the configuration of a heretofore known DC-DC converter control circuit shown in FIG. 4, a description thereof will be omitted. With regard to the voltage reduction threshold value "Vref−ΔV", by inputting the reference voltage Vref 11 into one input terminal of the voltage reduction comparator 100 and causing the voltage reduction comparator 100 to generate an input offset voltage of the predetermined voltage ΔV 101, a configuration equivalent to one wherein "Vref−ΔV" is input into a voltage reduction comparator with no input offset voltage may be realized, and a voltage lower by ΔV than the reference voltage Vref 11 may be generated and supplied.

To describe in detail, in FIG. 1, the output Vus 102 of the voltage reduction comparator 100 is at a high level when the feedback voltage Vd 53 is higher than "Vref−ΔV", and the PWM signal generator circuit 200, based on an output voltage Vea 12 of an error amplifier 10, carries out a normal PWM control (a fixed frequency PWM control), in the same way as with the configuration of the heretofore known DC-DC converter control circuit shown in FIG. 4.

Meanwhile, in FIG. 1, the output Vus 102 of the voltage reduction comparator 100 is at a low level when the feedback voltage Vd 53 is lower than "Vref−ΔV". On Vus 102 changing to a low level, the PWM signal generator circuit 200 interrupts the normal PWM operation, and carries out an operation of activating a switch SW 30 for an ON time determined based on the output voltage Vea 12 of the error amplifier 10, and deactivating the switch SW 30 for a predetermined OFF time after the ON time has elapsed. By repeating this operation, when the output voltage Vout 44 of the DC-DC converter drops below a predetermined value ((Vref−ΔV)/(voltage divider circuit 50 voltage division ratio), a pulse that continually turns the switching element on before and after the predetermined OFF time (this is set to be a short time) is supplied, and it is possible to suppress the drop of the output voltage Vout 44 until the output voltage Vea 12 of the error amplifier 10 rises.

Figure 2:
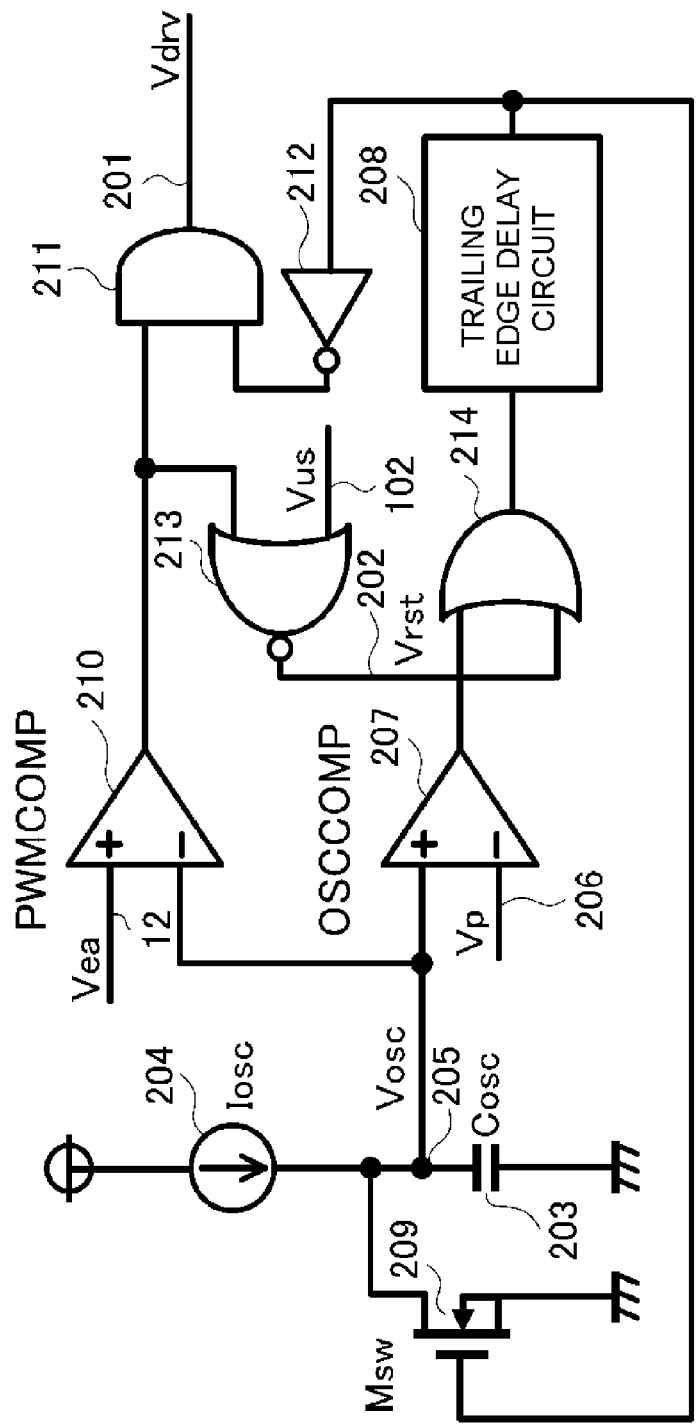
FIG. 2 is a diagram showing a configuration of a PWM signal generator circuit used in the DC-DC converter control circuit shown in FIG. 1.

FIG. 2 is a diagram showing a configuration of the PWM signal generator circuit used in the DC-DC converter control circuit shown in FIG. 1. An operation of the PWM signal generator circuit shown in FIG. 2 will be described while referring to the waveform diagrams shown in FIGS. 3A and 3B. In the embodiment, it is assumed that the switch 30 is turned on when a switch drive signal Vdrv 22 is at a high level, and that the switch 30 is turned off when the switch drive signal Vdrv 22 is at a low level, but the invention is not limited to this. For example, in a case in which the switch 30 is turned off when the switch drive signal Vdrv 22 is at a high level, and the switch 30 is turned on when the switch drive signal Vdrv 22 is at a low level, it is sufficient to add an inverter circuit (inverting gate element) to the output of an AND circuit 211.

With the PWM signal generator circuit in FIG. 2, as Vrst 202, which is the output of a NOR circuit 213, is always at a low level when the output Vus 102 of the voltage reduction comparator 100 is at a high level (refer to 5 of FIG. 3A), the PWM signal generator circuit 200 carries out the normal operation (the fixed frequency PWM control). At this time, a capacitor Cosc 203 is charged by a constant current supplied from a current source Iosc (204), and when Vosc 205 reaches Vp 206, the output of a first comparator OSCCOMP 207 changes to a high level (refer to 4 of FIG. 3A), the gate input of a discharge transistor Msw 209 changes to a high level via a trailing edge delay circuit 208, and Cosc 203 is discharged. Because of this, Vosc 205 becomes a GND potential, and the output of the first comparator OSCCOMP 207 returns to a low level (refer to 4 of FIG. 3A) (strictly speaking, the output of the first comparator OSCCOMP 207 returns to a low level at a timing at which Vosc 205 becomes smaller than Vp 206, but as the discharge of Cosc 203 is momentary, the timing at which Vosc 205 becomes smaller than Vp 206 and the timing at which Vosc 205 becomes the GND potential are essentially the same). Subsequently, the output of the trailing edge delay circuit 208 returns to a low level after a predetermined delay time Td has elapsed (refer to 7 of FIG. 3A). Because of this, Msw 209 is turned off, and Vosc 205 starts to rise again. By this being repeated, Vosc 205 becomes a sawtooth wave (refer to 1 of FIG. 3A).

Meanwhile, a second comparator PWMCOMP 210 outputs at a high level when the output voltage Vea 12 of the error amplifier 10 is greater than Vosc 205 (refer to 3 of FIG. 3A). Consequently, the higher Vea 12 is, the longer the period for which the second comparator PWMCOMP 210 outputs at a high level. Furthermore, by taking the logical product of the output of the second comparator PWMCOMP 210, and a signal wherein the output of the trailing edge delay circuit 208 is inverted in an inverter circuit 212, in the AND circuit 211, the minimum value Td of the OFF time is provided so that the output (=switch drive signal) Vdrv 201 of the AND circuit 211 is always at a low level during the period for which the output of the trailing edge delay circuit 208 is at a high level (refer to 2 and 7 of FIG. 3A).

Meanwhile, in FIG. 2, when the output Vus 102 of the voltage reduction comparator 100 is at a low level, the output (=switch drive signal) Vdrv 201 of the AND circuit 211 changes to a high level (refer to 2 of FIG. 3B) at a point at which the output of the trailing edge delay circuit 208 changes to a low level (refer to 7 of FIG. 3B). Meanwhile, when the output Vus 102 of the voltage reduction comparator 100 is at a low level, Vrst 202, which is the output of the NOR circuit 213, changes to a high level only at a point at which the output of the second comparator PWMCOMP 210 changes to a low level, and is at a low level at times other than this (refer to 5 of FIG. 3B). Because of this, the trailing edge delay circuit 208 outputs at a high level when the output of the second comparator PWMCOMP 210 changes to a low level (refer to 7 of FIG. 3B). Because of this, as the gate input of Msw 209 is at a high level, Cosc 203 is discharged. When Vosc 205 becomes the GND potential, the output of the second comparator PWMCOMP 210 returns to a high level (refer to 3 of FIG. 3B) (strictly speaking, the output of the second comparator PWMCOMP 210 returns to a high level at a timing at which Vosc 205 becomes smaller than Vea 12, but as the discharge of Cosc 203 is momentary, the timing at which Vosc 205 becomes smaller than Vea 12 and the timing at which Vosc 205 becomes the GND potential are essentially the same). Subsequently, the output of the trailing edge delay circuit 208 returns to a low level after the predetermined delay time Td has elapsed, Msw 209 is turned off, and Vosc 205 starts to rise again (refer to 1 of FIG. 3B). As a result of this, the output (=switch drive signal) Vdrv 201 of the PWM signal generator circuit changes to a high level again after the predetermined time (minimum OFF time) Td determined by the trailing edge delay circuit 208 has elapsed (refer to 7 of FIG. 3B).

As a period from the output of the second comparator PWMCOMP 210 changing to a low level until Cosc 203 is discharged and the output of the second comparator PWMCOMP 210 returns to a high level is momentary, the time for which the output of the trailing edge delay circuit 208 is at a high level is equivalent to Td. Then, as a period for which the output of the second comparator PWMCOMP 210 is at a low level is momentary, a period for which the output (=switch drive signal) Vdrv 201 of the AND circuit 211 is at a low level is also equivalent to Td. That is, when the output Vus 102 of the voltage reduction comparator 100 is at a low level, the ON time of the switching element is determined based on the output voltage Vea 12 of the error amplifier 10, and the OFF time is the predetermined off time Td.

What is claimed is:

1. A control circuit of a DC-DC converter that includes a switching element, comprising:
    an error amplifier that amplifies a difference between a reference voltage and a feedback voltage corresponding to an output voltage of the DC-DC converter, and outputs the amplified difference;
    a voltage reduction comparator that outputs an interrupt signal when the feedback voltage is lower than a voltage reduction threshold that has a value lower than that of the reference voltage; and
    a pulse-width modulation (PWM) signal generator circuit that,
        when no interrupt signal is generated by said comparator, generates a PWM signal of a predetermined frequency based on the amplified voltage difference output by the error amplifier, and,
        when the interrupt signal is generated by said comparator, generates a switch drive signal to activate the switching element for a first period of time corresponding to the amplified voltage difference, and to deactivate the switching element for a second period of time after the first period of time has elapsed.

2. The control circuit according to claim 1, wherein the voltage reduction threshold is realized by inputting the reference voltage into an input terminal of the voltage reduction comparator, and causing the voltage reduction comparator to generate a predetermined input offset voltage.

3. The control circuit according to claim 1, wherein the voltage reduction threshold is realized by generating a voltage that is lower than the reference voltage by a predetermined amount, and supplying the generated voltage to an input terminal of the voltage reduction comparator.

4. The control circuit according to claim 1, wherein the feedback voltage is obtained by dividing the output voltage of the DC-DC converter using a voltage divider.

5. A control method of a DC-DC converter that includes a switching element, comprising:
    amplifying a difference between a reference voltage and a feedback voltage corresponding to an output voltage of the DC-DC converter, and outputting the amplified difference;
    outputting an interrupt signal when the feedback voltage is lower than a voltage reduction threshold that has a value lower than that of the reference voltage; and
    shifting, when an interrupt signal is generated, a signal for driving the switching element, from a pulse-width modulation (PWM) signal of a predetermined frequency generated based on the amplified voltage difference, to a switch drive signal that activates the switching element for a first period of time corresponding to the amplified voltage difference, and deactivates the switching element for a second period of time after the first period of time has elapsed.

6. The control method according to claim 5, further comprising inputting the reference voltage into an input terminal of a voltage reduction comparator, and causing the voltage reduction comparator to generate a predetermined input offset voltage, to thereby realize the voltage reduction threshold.

7. The control method according to claim 5, further comprising generating a voltage that is lower than the reference voltage by a predetermined amount, and supplying the generated voltage to an input terminal of a voltage reduction comparator, to thereby realize the voltage reduction threshold.

8. The control method according to claim 5, further comprising dividing the output voltage of the DC-DC converter using a voltage divider to obtain the feedback voltage.

* * * * *